United States Patent [19]
Nakazato

[11] 3,820,226
[45] June 28, 1974

[54] METHOD OF ASSEMBLING NUCLEAR REACTOR FUEL ELEMENT SPACER ASSEMBLY

[75] Inventor: Susumu Nakazato, Pittsburgh, Pa.

[73] Assignee: Continental Oil Company, Ponca City, Okla.

[22] Filed: July 12, 1972

[21] Appl. No.: 270,876

Related U.S. Application Data

[62] Division of Ser. No. 41,967, June 1, 1970, Pat. No. 3,746,618.

[52] U.S. Cl. ................................. 29/428, 29/446
[51] Int. Cl. .............................................. B23p 19/00
[58] Field of Search .......... 29/428, 446; 176/76, 78

[56] References Cited
UNITED STATES PATENTS

| | | | |
|---|---|---|---|
| 2,948,517 | 8/1960 | Cosner | 176/78 X |
| 3,287,231 | 11/1966 | Frisch | 176/76 X |
| 3,298,922 | 1/1967 | Prince et al. | 176/78 |
| 3,301,764 | 1/1967 | Timbs et al. | 176/78 |
| 3,301,765 | 1/1967 | Eyre et al. | 176/78 |
| 3,349,004 | 10/1967 | Lass et al. | 176/78 |
| 3,368,945 | 2/1968 | Keller et al. | 176/78 X |
| 3,379,618 | 4/1968 | Frisch | 176/78 |
| 3,600,792 | 8/1971 | Valluy | 29/428 |
| 3,665,586 | 5/1972 | Jabsen | 29/428 |

FOREIGN PATENTS OR APPLICATIONS

| | | | |
|---|---|---|---|
| 1,519,656 | 2/1968 | France | 176/78 |

*Primary Examiner*—Charlie T. Moon
*Attorney, Agent, or Firm*—Ronnie D. Wilson

[57] ABSTRACT

A nuclear reactor fuel element spacer arrangement having a fuel element supporting and spacing means in the form of spacer tubes mounted on tie rods or bars secured to a resilient supporting sleeve with the tie rods in tension. The spaces between the spacer tubes are such that the fuel elements are gripped between adjacent spacer tubes or between spacer tubes and portions of the sleeve. The arrangement facilitates loading of the fuel elements and minimizes scratching of the fuel elements.

3 Claims, 7 Drawing Figures

METHOD OF ASSEMBLING NUCLEAR REACTOR FUEL ELEMENT SPACER ASSEMBLY

This is a division, of application Ser. No. 41,967, filed June 1, 1970 now U.S. Pat. No. 3,746,618.

This invention relates to nuclear fuel assemblies of the type comprising a bundle of elongated fuel elements and more particularly to means for supporting and spacing the fuel elements in an assembly.

An object of the invention is to provide effective restriction of lateral motion of the fuel rods held in an assembly of such rods.

Another object is to make provision for preserving the integrity of the fuel elements.

Another object is to enhance the flow of coolant in the assembly.

Still another object is to facilitate the making of the assembly.

An assembly of fuel rods commonly used heretofore has involved arranging a number of fuel rods containing fissionable material in a parallel array and confined within an area, for example a square cross-sectional area, for the assembly. Provision has been made for coolant to flow past the spaced fuel rods within the space between rods and parallel to the axes of the rods so that the heat generated by the fissionable material in the rods is transferred to the coolant for such utilization as may be desired. The bundle of rods is ordinarily held at its opposite ends, and since the fuel rods have a degree of flexibility which would permit lateral motion at positions between the ends, it has been common to maintain the spacing pitch between rods and to restrict the lateral motion of the rods at positions between their ends while providing freedom for each rod to move axially under thermal expansion.

It is well known that restriction of lateral motion of the fuel rods is necessary to avoid undesirable effects such as neutron peaking and flow channelling which can cause hot spots to develop on the rods. A further reason for desiring lateral restriction is to dampen vibrations that can lead to undesired fretting of the fuel rods.

For the purpose of maintaining the fuel rods in their appointed positions and spacings in the assembly and for restriction of the lateral motion, grid-like spacers for the rods have heretofore been provided.

The grid spacers heretofore generally in use for the purpose of restricting the lateral motion of the fuel rods have utilized a grid of sheet metal in what may be called an egg-crate arrangement and provided with some form of spring fingers to grip the rods. In order to make such a grid spacer into a rigid integral unit and free from crevice corrosion, it has been a practice to braze the grid corners. Such a fabrication procedure has been costly as it has involved the steps of stamping grid plates, forming spring fingers into plates, assembling, brazing and then age hardening to obtain spring resiliency. Since such a grid spacer is fully assembled before the inclusion of the fuel rods, the fuel rods would then be inserted into the assembled grid spacer, which can cause scratching of the fuel rod surface.

A common form of fuel rod comprises a tubing of a material such as Zircalloy containing fissionable material, the tubing being commonly coated with an oxide which acts as a protective coating. When such a fuel rod tubing is inserted through a pre-assembled grid the oxide coating can be scratched off. Since the spacer must have resilience and strength, the spacer material is ordinarily a relatively hard metal such as Inconel which is harder than a fuel rod tubing material like Zircalloy, and this can cause the rod tubing to wear where it is in contact with the spacer grid. Furthermore Inconel has a relatively high neutron cross-section.

In accordance with the present invention there is provided a grid spacer arrangement in which there is less metallic mass than in prior spacer designs, and hence less restriction of the flow of coolant and also less absorption of neutrons. Furthermore the usual brazing operation is made unnecessary and scratching of fuel rods during assembly is avoided. Use of the present invention permits a stacking procedure during assembly of the fuel elements which reduces the possibility of scratching the fuel rod surfaces. Moreover, use of the present invention permits accommodation of variations in fuel rod diameters due to fabrication tolerances.

The invention is carried out by arranging a plurality of hollow spacer tubes with their longitudinal axes parallel to each other, the tubes being mounted on tie rods whose opposite ends are fastened to opposite sides of a sleeve which encompasses the array of spacing tubes. The sleeve is made resilient and the tie rods are fastened to the sleeve in tension.

According to a preferred feature there are two sets of tie rods, the tie rods of one set extending parallel to each other in one direction and the tie rods of the other set extending at an angle, preferably perpendicular, to the tie rods of the first mentioned set. There is thus provided an array of spacing tubes within the sleeve such that spaces exist between groups of four of the spacer tubes, and each of these spaces is of the proper dimensions so that a fuel rod may be inserted between the spacer tubes of any group of four, in the direction parallel to the longitudinal axes of the parallel spacer tubes. The fuel rods are thus in contact with, and gripped with pressure by, each of the four spacer tubes in the group. Since the tie rods are in resilient tension the spacer tubes exert a resilient pressure against the fuel rods.

According to an optional feature, the sleeve is shaped so that fuel rods can be snuggly fit between the wall of the sleeve and adjacent ones of the spacer tubes. When all of the spaces between the spacer tubes and between the outer spacer tubes and the surrounding sleeve are filled there results an array or bundle of spaced parallel fuel rods.

The foregoing and other features of the invention will be better understood from the following detailed description and the accompanying drawings of which:

Figure 1:
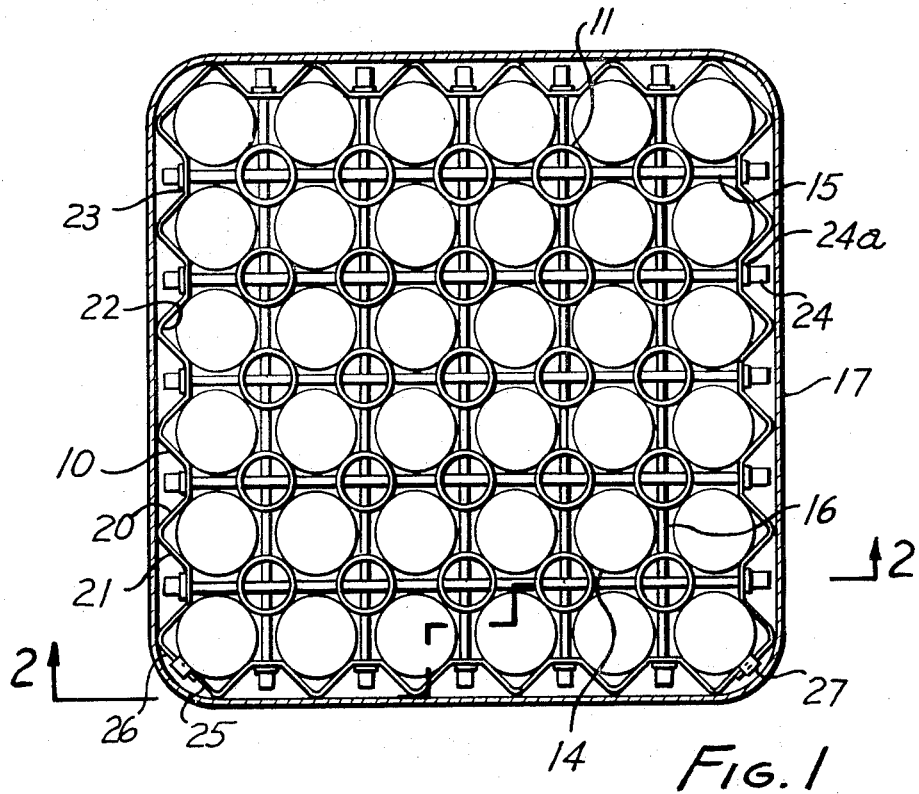
FIG. 1 is a top cross-sectional view of a nuclear fuel rod spacer assembly according to this invention.
Figure 2:
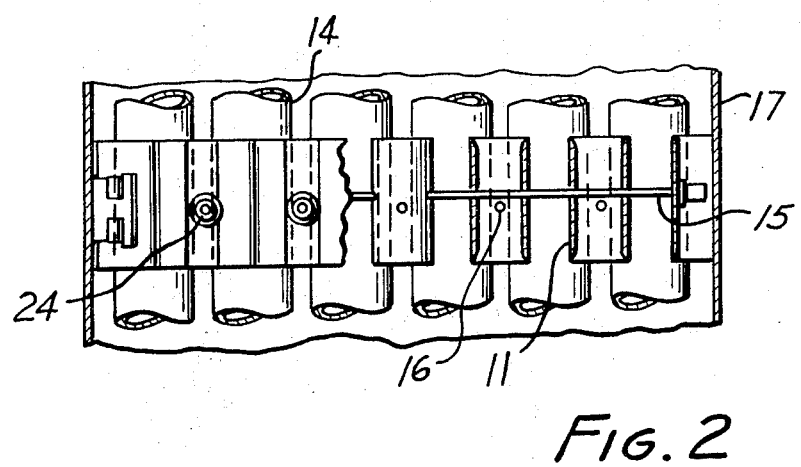
FIG. 2 is a side view in cross-section taken at line 2—2 of FIG. 1.

Referring to FIGS. 1 and 2 there is shown a nuclear fuel rod spacer assembly for supporting nuclear fuel rods, ordinarily in a vertically extending position, in an array within an area bounded by a sleeve comprising a strip 10 formed into an enclosure shown as a square shape having rounded corners. There are placed within the square enclosure a number of parallel rows of spacer tubes 11, all of equal dimensions, the rows being spaced equal distances apart from each other and the spacer tubes of each row being equi-distance apart from each other. The respective spacer tubes of each row form, with the corresponding tubes of the other parallel rows, a number of straight columns parallel to each other and perpendicular to the rows. Since this assembly presents a square pitch array there are as many spacer tubes 11 in each row, as there are in each column, which in the example illustrated, is five spacer tubes. All of the spacer tubes 11 are of the same diameter and axial length.

The dimensions, spacing and positions of all the spacer tubes, all of which are of the same diameter and axial length, are such that fuel rods 14, which are all of the same diameter, can be fitted into the spaces between each four adjacent spacer tubes.

The spacer tubes are supported in their positions by tie rods 15 and 16, the tie rods 15 being all parallel to each other and the tie rods 16 also being parallel to each other and perpendicular to tie rods 15. Each tie rod is fastened at its opposite ends to opposite sides of the square enclosure 10.

Each of tie rods 15 extends diametrically through each spacer tube 11 of a row. For the purpose of this mounting, each spacer tube is provided with holes through its opposite sides so that the rods can extend through. The set of tie rods 16 are placed in a different plane, that is off set from, the plane of the tie rods 15 and the holes through the tubes for tie rods 16 will be located at the proper angle from the holes for tie rods 15.

The tie rods are held at their ends in resilient tension, the resilience being provided by a resilient quality of the sleeve 10. For this purpose the sleeve, of resilient material is given a serrated form having oblique flat faces 20 and 21 separated by outer folds 22 and by inner flat faces 23, which extend perpendicular to and receive respective tie rods. The tie rods shown passing through faces 23 of the sleeve are provided at their opposite ends outside the sleeve with a fastener 24 by crimping the shank of the fastener against the tie rod so that the collar 24a attached to the shank will press against the face 23.

The positions of the oblique faces 20 and 21 of the sleeve are such as to correspond to the positions of the spacer tubes 11 in the interior of the enclosure. Thus the fuel rods in the assembly engage the respective spacer tubes 14 and the outer fuel rods also engage the respective flat faces 20 and 21, these flats in effect being located substantially tangential to what would be the point of contact of the spacer tubes.

The sleeve can conveniently be made up of more than one piece. The sleeve 10 in FIG. 1 is shown as being made up of a strip which encompasses three sides of the square and a second strip which encompasses the remaining side of the square, the ends of these strips being fitted together by their oblique end flats 25 and 26, which are overlapped and held in place by tabs 27 attached to each end flat and bent over the other end flat. When the assembly of spacer tubes on the tie rods and fuel rods is completed, the tie rods are tensioned by crimping their end fasteners against the surfaces 23 of the sleeve with the rods in tension. Alternatively the fastening may be done by bending, screwed nut, welding or other suitable means. Owing to the serrated form of the sleeve a degree of spring action of the sleeve material is provided by reason of the serrated form which is subject to a degree of distortion. The resiliency is derived from the elastic displacement of the sleeve section and the tension is controlled by the sleeve displacement made at the time of fastening.

The assembly is preferably accomplished by building it up row by row. This can be done, for example, by providing an upper and a lower means (not shown) for holding the fuel tubes in their assigned vertical positions shown in FIG. 1, and aligning the sleeve 10 in a position vertically between these upper and lower tube gripping devices. A row of fuel rods 14 is placed along a side of the square sleeve in contact therewith with the fuel rods held from above and below by the tube gripping means in their proper spaced positions in the row. Then the adjacent row of the spacer tubes 11 is placed in position and the related tie rods run through them. Then the next row of fuel tubes are set into their positions followed by the succeeding row of spacer tubes on their tie rods. In this manner the rows of fuel tubes and spacer tubes are built up row by row in the array. When all of the rows of tubes are in position, the perpendicular sets of of tie rods 15 and 16 are fastened through the opposite sides of the sleeve in their respective positions. The tie rods can be fastened to the respective sides of the sleeve as by crimping, bending, screw nut, welding or other suitable means.

For utilization in a nuclear reactor, the assembly held within the sleeve 10 is placed within a channel 17, shown in the same general square shape as the sleeve 10. The folds 22 of the sleeve will serve to fit the sleeve snuggly within the channel while leaving spaces between the sleeve and channel for coolant flow. In order to engage the four fuel rods which are at the respective four corners of the square array the corners of the sleeve are formed into three sides as shown, with the two opposite sides converging somewhat so that the corner fuel rod is engaged at three positions of the sleeve the respective corner fuel rod and hold it against the other corner and by one spacer tube. This will cause the three sides of the sleeve corner to spring somewhat and thereby grip the fuel rod.

Figure 3:
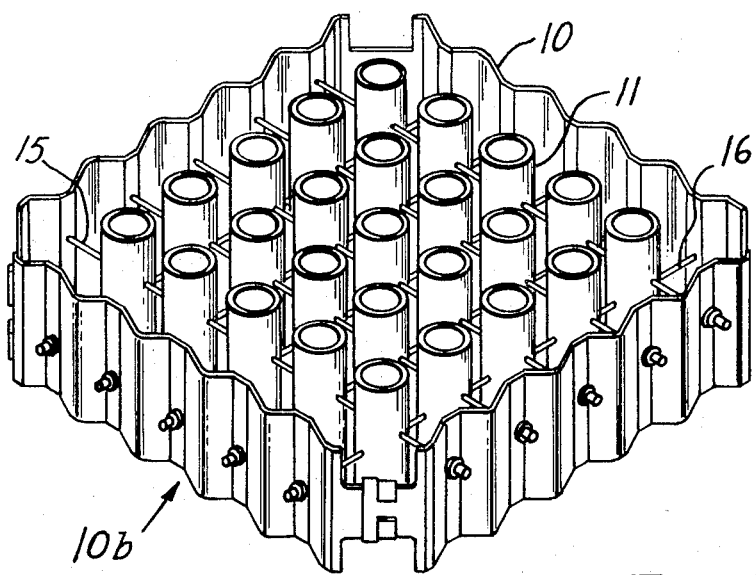
FIG. 3 is an isometric view of the spacer tube assembly of FIGS. 1 and 2.
Figure 4:
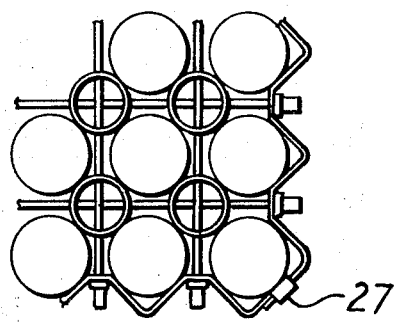
FIG. 4 shows a detail of the assembly of FIG. 3.

FIG. 3 is an isometric view of the spacer tube arrangement shown in FIGS. 1 and 2. FIG. 4 shows a sleeve corner of FIG. 3 with bent tabs 27 to close the sleeve after assembly.

Assembly of the arrangement of FIG. 3 is facilitated by leaving one side 10b open during assembly of the spacer tubes and fuel tubes in the general manner described in connection with FIG. 1, and then completing the enclosure of the sleeve by attaching the side 10b in its position. This can be done by constructing the open ends of the sleeve at this side 10b with end tabs 27 which overlap each other.

Figure 5:
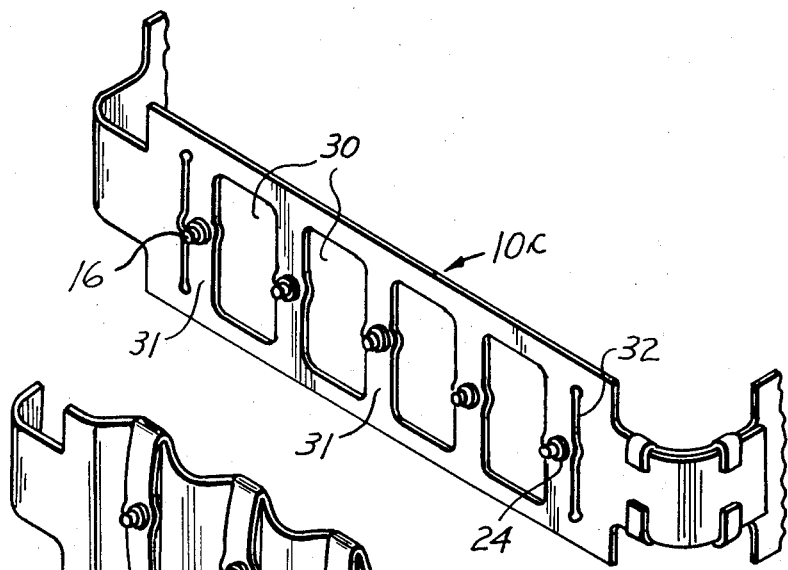
FIGS. 5, 6 and 7 show optional variations of sleeve construction which can be used in the assemblies of FIGS. 1 and 3.

FIG. 5 shows a portion of a sleeve arrangement which can be used in lieu of those shown in FIGS. 1 and 3. In FIG. 5 the sleeve 10c is provided with a number of openings or cut-outs 30 forming a number of spaced and vertically extending strips 31 which receive the ends of the tie rods 15 and 16 which are gripped by the fastener shanks 24. Vertically extending slots 32 near the ends of each side of the sleeve serve to define the end strips 31 on each side of the sleeve. In this arrangement the resilient deformation of the strips 31 is used to tension the tie rods. This structure does not, by itself, provide for rows of fuel rods in contact with the sleeve.

Figure 6:
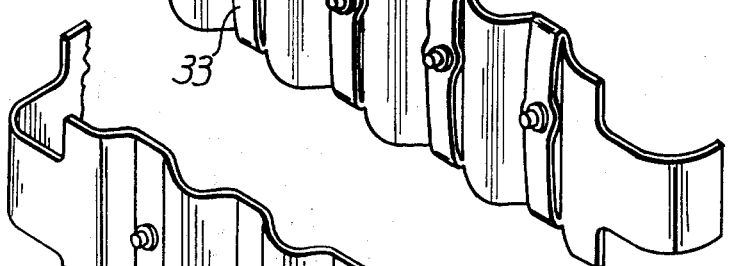

A further possible modification of the sleeve structure is shown in FIG. 6 wherein vertically extending leaf spring elements 33 bow outwardly from their upper and lower positions of support on the sleeve. The region of the sleeve inside these leaf springs is left open so that the tie rods can extend through the leaf springs where they are fastened by the fasteners in the same manner as in FIG. 5. The regions of the sleeve between the springs are serrated thereby forming portions oblique to the sides of the general square shape of the grid structure.

Figure 7:
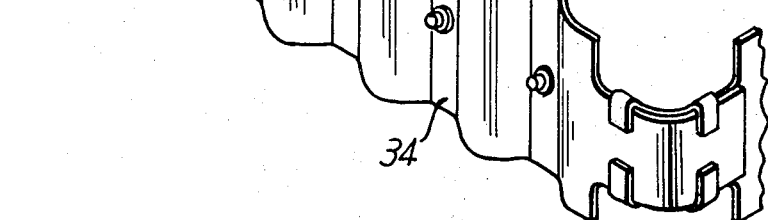

The sleeve construction shown in FIG. 7 is similar to that of FIG. 6 except for the absence of outwardly protruding spring members such as 33 in FIG. 6 and the use, instead, of the inner flat portions 34 to which to attach the tie rods.

A similar tab-attaching arrangement is provided at the opposite end of side 10b from that just described.

Ordinarily there will be more than one of the grid spacers located vertically apart from each other in a nuclear fuel rod assembly, the number of the grid spacers depending on the length of the fuel rods.

It will be recognized that the by the present invention, there is provided a fuel tube spacer grid which, by reason of the ability to assemble it row by row with the fuel tubes, avoids the undesirable scratching of the fuel tubes which is likely to occur if the fuel tubes were inserted through a grid which is already assembled. It will be further recognized that the grid structure according to the present invention presents less metallic mass and hence less coolant flow restriction and also less absorption of neutrons than in prior known grid structures.

The simplicity of the arrangements according to this invention as compared with prior-known arrangements which have involved the formation of spring fingers into plates and brazing, followed by age hardening to obtain spring resilience, will also be recognized.

What is claimed is:

1. The method of assembling a bundle of rod-like fuel elements having a longitudinal length substantially greater than the distance across their cross section with spacing between the individual elements of the bundle, which comprises: supporting a row of the fuel elements spaced from each other near a side of a sleeve which will encompass the fuel elements, providing means for spacing at least the major part of the fuel elements of the row from the sleeve, mounting on a tie rod a row of spacer tubes at the far side of said row of fuel elements from said side of the sleeve and in contact with sides of the fuel elements, fastening said tie rod to opposite sides of said sleeve under tension by resiliently deforming the part of the sleeve in the area of the fastening at positions such that the spacer tubes on said sleeve are pressurized by contact between the fuel elements and the respective spacer tube.

2. The method according to claim 1 in which successive alternate rows of fuel elements and spacer tubes on tie rods fastened to the sleeve are built up until the area within the sleeve is fully occupied by the fuel elements, spacer tubes and tie rods, leaving spaces along the fuel elements and through the spacer tubes through which coolant fluid can flow.

3. The method according to claim 2 which comprises arranging the spacer tubes in columns substantially perpendicular to the rows and attaching the spacer tubes of each column to a respective tie rod which extends substantially perpendicular to the tie rods on which the rows of spacer tubes are mounted and which are fastened to opposite sides of the sleeve.

* * * * *